Nov. 16, 1943.   C. K. CRAWFORD   2,334,610
MIRROR AND SUPPORTING ARRANGEMENT
Filed June 13, 1941   2 Sheets-Sheet 1
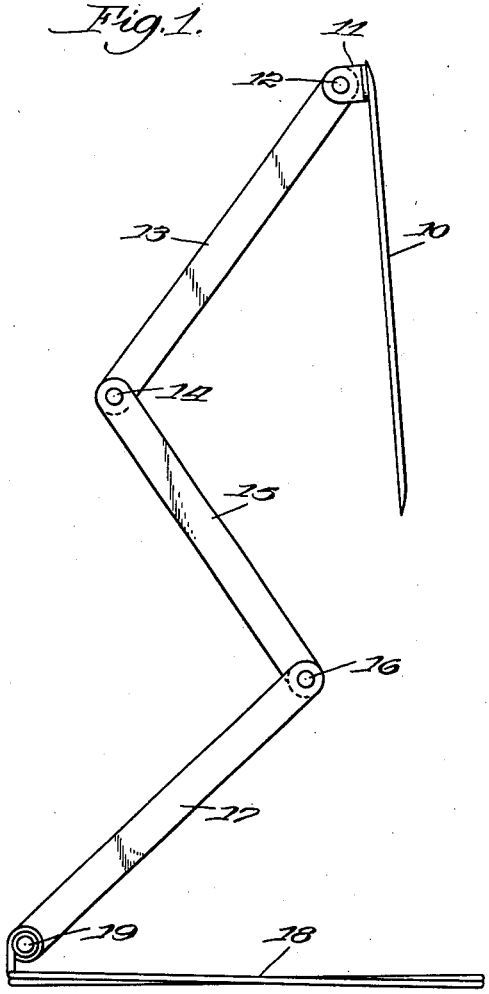
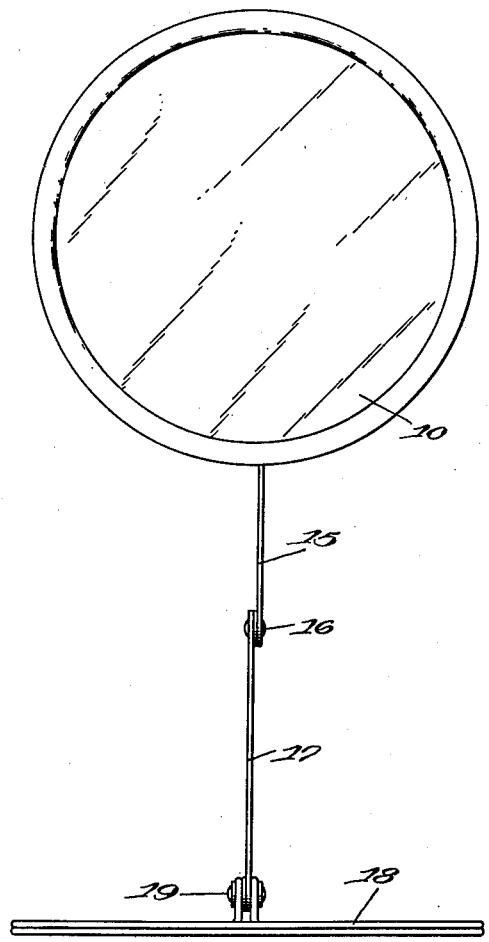
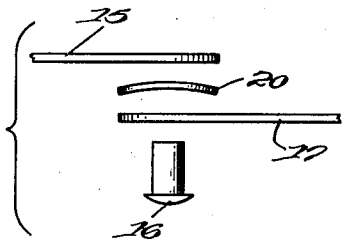
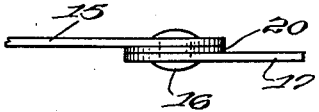
Inventor:
Charles K. Crawford.
By Chritton, Wiles, Davies & Hirscal.
Attys.

Nov. 16, 1943.                C. K. CRAWFORD                    2,334,610
                    MIRROR AND SUPPORTING ARRANGEMENT
                         Filed June 13, 1941            2 Sheets-Sheet 2
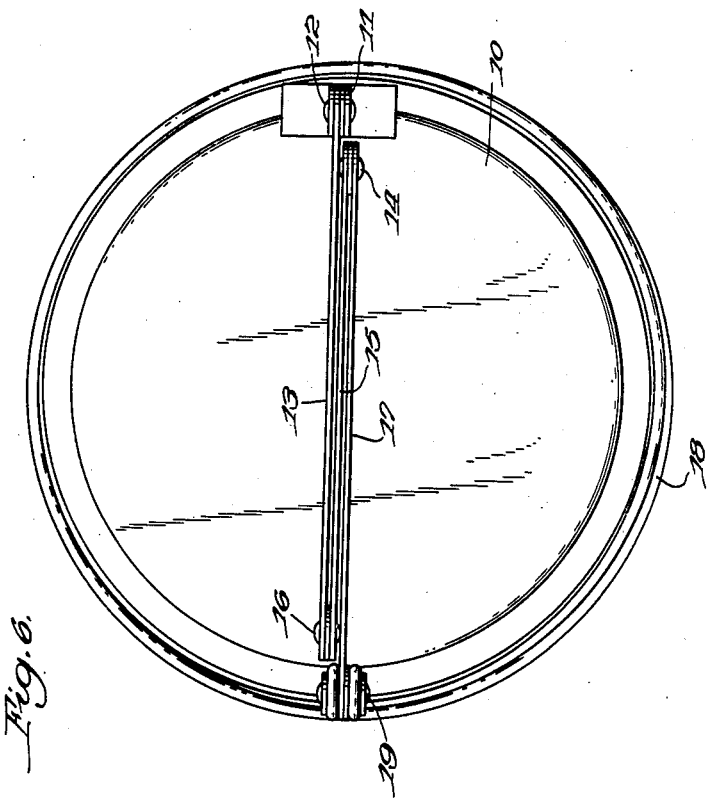
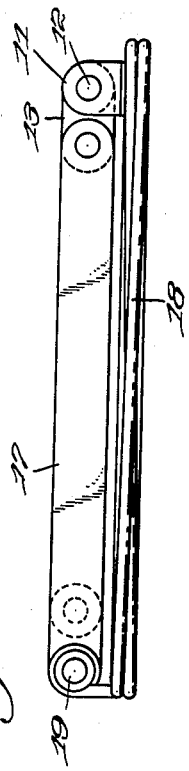
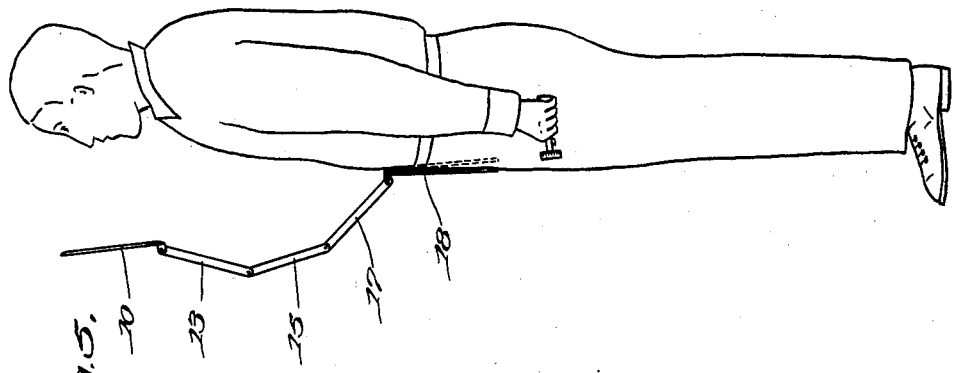
Inventor:
Charles K. Crawford.
By Chritton, Wiles, Davis & Hirschl.
Attys.

Patented Nov. 16, 1943

2,334,610

UNITED STATES PATENT OFFICE 2,334,610

MIRROR AND SUPPORTING ARRANGEMENT

Charles K. Crawford, Chicago, Ill., assignor to Julia McLean Crawford

Application June 13, 1941, Serial No. 397,969

1 Claim. (Cl. 88—97)

This invention relates to a mirror and a supporting arrangement therefor, and more particularly to a small mirror for personal use with a supporting arrangement adapted to support it in usable position in any of a number of different ways.

One feature of this invention is that it provides an improved personal mirror; another feature of this invention is that, by the combination of a supporting or base element of a particular type and movable supporting means of substantial length, the mirror may be supported in a desired position for use under almost any conceivable situation and in a number of different ways; yet another feature of this invention is that the parts are so arranged that they may be compactly associated when desired, so that the entire apparatus takes up little space; a still further feature of this invention is the provision of sufficient friction between the parts of the supporting arrangement to maintain them in any relative position to which they may be moved, but not so much as to cause binding and prevent ready movement of the parts with respect to each other; another feature of this invention is that it provides a light compact personal mirror and supporting apparatus therefor particularly designed for the soldier, camper, or the like; other features and advantages of this invention will be apparent from the following specification and the drawings, in which:

Figure 1 is a side elevational view of the mirror and supporting arrangement; Figure 2 is a front elevational view of the apparatus shown in Figure 1; Figure 3 is an exploded detail view of one of the joints between the supporting members; Figure 4 is a view of the parts shown in Figure 3, but in operative relation; Figure 5 is an illustrative view of one use of my apparatus; Figure 6 is a plan view of the apparatus with all of its parts compactly associated; and Figure 7 is a side view of the apparatus as shown in Figure 6.

There are many conditions under which it is desirable to support a small personal mirror under circumstances where the ordinary mirror could not be properly and readily supported in usable position, without the use of the hands. A man making his toilet in his own home has a wall mirror before which he can shave, comb his hair, and the like, or plenty of hooks or shelves to support a personal mirror. When a man is in the barracks of an army camp, for example, in the field, hunting or fishing, living in tents, trailers, or crowded rooming houses, conditions are considerably different. To take the situation in an army camp barracks as illustrative, hooks or shelves within the barracks where a mirror might be placed are frequently in dark places, and there may be a dozen men desiring to make their toilet for each such place. Under these conditions it is desirable to have a mirror and supporting arrangement enabling the mirror to be supported in usable position upon the person of the user himself, over the edge of a door, from the branch of a tree, or a rock, or any of a number of other places; and I have provided a mirror and supporting arrangement adapted for this.

Heretofore the only mirror and supporting arrangement not specifically designed for a shelf or wall hook was an arrangement whereby the mirror was held before the face by a hook adapted to pass around the neck of the user. In this previously known arrangement, however, there was no alternative to this particular form of use, and my arrangement provides an improvement in that the mirror does not have to be supported from the user if there is any other conceivable place from which it may be supported. A stationary support, of course, is more desirable under certain circumstances, since it enables the user to bring a different part of his body into view in the mirror merely by moving his body, and without moving the mirror. That is, a man who has been shaving with a mirror hung around his neck has to readjust the mirror to comb his hair; whereas, if the same mirror is hung over a tree branch or supported from a rock or stump, he does not have to rearrange it, it being only necessary to drop his head a little to see his hair. Moreover, while my mirror is here being described illustratively in connection with its use by men, it will be understood that it is also highly desirable under certain circumstances for a woman.

In the particular embodiment of my invention illustrated herewith a small, light circular mirror 10, made of stainless steel, chromium-plated metal, or the like, is provided with a bracket 11 pivotally connected by the rivet 12 to a metal strip 13. This strip is in turn pivotally connected by the rivet 14 to the metal strip 15, and this in turn to the strip 17 by the rivet 16. These metal strips provide movable supporting members for connecting the mirror to a base or supporting element 18. This supporting element is formed in one plane and has a continuous periphery, being preferably formed of a single continuous piece of spring metal wire brought around in two loops, the ends of the wire being turned up at right angles and looped in a very small circle to receive the rivet 19 pivotally connecting the member 17 to the base or supporting element 18.

As may be best understood from Figures 3 and 4, all of the joints between the parts are arranged with sufficient friction to maintain their weight in any relative position to which the parts may be moved, yet not so much as to prevent ready manual movement thereof. In Figure 3 the parts of the joint between the strip members 15 and 17 are shown before the connection is made, it being seen that a spring metal washer 20 is interposed between the members 15 and 17. When all of these parts are brought into final operative relation, as shown in Figure 4, the curve in the spring metal washer 20 is almost completely flattened out and the parts 15 and 17 are therefore under a friction determined by the springiness of this washer. Attempts to maintain a desired predetermined amount of friction in an ordinary riveted or bolted joint fail upon the slightest wear of the parts, but by the inclusion of an arched spring washer of this type sufficient friction may be maintained throughout the life of the apparatus without there ever being an undesired or too great amount.

In order that the parts may be compactly associated to enable them to be readily slipped into the pocket, packed in a knapsack or pack, or the like, the diameter of the mirror is made slightly smaller than that of the circular wire loops of the supporting base 18; the supporting members 13 and 17 are made of a length slightly less than the diameter of the mirror; and the intermediate supporting member 15 is made still shorter. As may be best seen in Figures 6 and 7, this enables the parts to be folded down with the mirror lying within the wire loops and the supporting members compactly associated.

By making the intermediate member shorter than the others the joints between the members do not conflict with the brackets or end joints, but fold down in a compact manner, as may be readily seen from the drawings.

The provision of a supporting or base element of two circular loops of wire is particularly important. This provides a flat base enabling the mirror to be supported in any desired position from any flat surface, as illustrated in Figures 1 and 2, whether such surface be a shelf, a branch, a stump, or even the ground. The fact that the base element is a loop enables it to be looped or hung over a number of different things, not only a nail or hook in the wall, but also over a door knob, a light switch, a tree branch, or in fact practically any projecting object having a diameter less than that of the loop. Even where it may not be convenient to slip the loop over something, the loop and supporting member 17 may be formed into a V and this V hooked over some available place, as the top of a door or a very thick branch. In addition to enabling the mirror to be supported from a stationary object under practically any conceivable conditions, the double loop enables it to be conveniently supported from the body of the user. As shown illustratively in Figure 5, one of the loops may be slipped to the inside and the other to the outside of the belt or waistband of a man's trousers, the supporting members having sufficient length to enable the mirror to be placed in proper usable position, as shown. In a preferred embodiment of my invention a mirror has a diameter of about four inches, so that the relative size of the other parts may be easily seen from the drawings.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

Apparatus of the character described, including: a small, light mirror; a light supporting element comprising a continuous double loop of wire in one plane; and a plurality of supporting members movably connected to each other, the supporting element, and the mirror and enabling a wide variety of relative positions of the mirror and supporting element, whereby the mirror may be supported in usable position in any of a number of different ways, the diameter of the supporting element being slightly greater than that of the mirror and the members having a length not greater than the diameter of said element, whereby the parts may be compactly associated when desired.

CHARLES K. CRAWFORD.